United States Patent Office 2,947,677
Patented Aug. 2, 1960

2,947,677

ELECTROPHORETIC COATING MATERIAL

Theodore W. Blickwedel, Emporium, Pa., assignor, by mesne assignments, to Sylvania Electric Products Inc., Wilmington, Del., a corporation of Delaware No Drawing. Filed July 11, 1958, Ser. No. 747,840

3 Claims. (Cl. 204—181)

This invention relates to a coating suspension adapted for use in an electrophoretic deposition process.

In various types of electron discharge devices or tubes, a cathode sleeve or ribbon coated with alkaline earth metal oxides such as those of barium, strontium and calcium are employed to provide the source of electrons for the device. This cathode material may be deposited on the ribbon or sleeves in the form of alkaline earth metal carbonates by an electrophoretic process. One cathode coating technique which has been proposed utilizes cataphoresis and a suspending medium for the carbonates comprising a polymethacrylate and up to .5% by weight of a soluble ionizable salt like sodium nitrate dissolved in a polar solvent such as acetone. In the process, the metallic sleeve or ribbon is made negative and the positively charged carbonate particles migrate to and deposit upon the sleeve. The electron emission characteristics of the coating are subsequently achieved in the tube processing when the carbonates are converted to oxides upon the application of heat.

The above described process and suspension have the disadvantages of being difficult to control, producing high density coatings, and necessitating the use of hazardous volatile solvents such as acetone. In addition, this high conductivity polar solvent type suspension tends to cause electroetching and electroxidation of the cathode base material.

Accordingly, an object of the invention is to reduce the aforementioned disadvantages and to enable close control of the density of cathode coatings deposited by electrophoresis.

A further object is to obtain a stable low volatile suspending medium for the electrophoretic deposition of electron emissive material.

Another object is the provision of a low conductivity suspension which tends to reduce electroetching and electroxidation of the cathode base material.

In accordance with one aspect of the invention, a suspension is used to electrophoretically coat a metal base which comprises alkaline earth carbonates and an alkaline earth nitrate suspended in a solution of a polymethacrylate dissolved in a non-polar organic solvent. During electrodeposition, the base metal is generally connected to the positive terminal of the power supply to attract the migrating negatively charged earth metal carbonate particles.

The electron emissive materials are normally deposited on the cathode base metal sleeve or ribbon in the form of alkaline earth metal carbonates such as carbonates of barium, strontium and calcium. A typical carbonate composition includes approximately 57% by weight barium carbonate, 39% by weight strontium carbonate and 4% by weight calcium carbonate. The exact composition of a cathode material, may, however, be varied in accordance with the type of tube in which it is to be employed and with the electrical characteristics desired.

The suspending medium for the carbonate materials comprises a polymethacrylate such as the polymerized forms of methyl, ethyl, propyl, butyl and isobutyl methacrylates dissolved in a non-polar organic solvent. Such a solvent may include hydrocarbon esters of organic acids like methyl, ethyl, diethyl, propyl, butyl, amyl, etc. acetates, carbonates and butyrates.

In order to obtain a proper electrophoretic response, it has been found that at least .5% by weight of an alkaline earth nitrate based upon the weight of the carbonates is needed in the suspension. A sufficient amount of this nitrate is generally present in the earth material carbonates in the form of nitrates of barium, strontium and calcium. If the desired amount of nitrate is not present in the carbonates, it may be added in granular form or made by adding a few drops of (70%) nitric acid. The concentration of nitrate should not exceed 10% by weight based upon the carbonates since deterioration in the electron emissive characteristics begins to occur above this concentration. It is to be noted that although the nitrate has been found necessary in the suspension, it does not serve as a soluble ionizable salt since it is practically insoluble in the non-polar solvents employed. The exact contribution of the nitrate to the suspension is not known for certain.

In certain types of electron tubes where excessive handling of the cathode is needed, it is desirable to obtain a flexible coating so that chipping and crumbling during handling will not occur. This objective may be achieved by adding to the suspension a small amount, e.g., from .005% to .02% of the total suspension volume of a plasticizer such as dibutyl phthalate or a poly-glycol such as methoxypolyethylene glycol.

The following suspension has been found to provide an excellent coating for wire of ribbon base type cathodes when ball-milled for approximately 15 hours prior to electrophoretic application, assuming that at least .5% of an alkaline earth nitrate is present in the carbonate:

500 grams—barium, strontium and calcium carbonates co-precipitated
180 grams—ethyl methacrylate polymer
90 milliliters—di-butylphthalate
2800 milliliters—amyl acetate The following suspension has been found to provide an excellent coating for sleeve or cylinder types of cathodes when ball-milled for approximately 15 hours prior to electrophoretic application, assuming that at least .5% of an alkaline earth nitrate is present in the carbonates:

500 grams—barium, strontium and calcium carbonates co-precipitated
30 grams—methyl methacrylate polymer
2000 milliliters—diethyl carbonate
10 milliliters—methoxypolyethylene glycol Although the percentages of materials in the above suspension may be varied, it has been found preferable to use from .5% to 10% by weight of the alkaline earth nitrate per carbonate weight and from 6% to 60% by weight of the polymethacrylate based upon the carbonate weight when dissolved in from 4 cc. per gram to 12 cc. per gram of the hydrocarbon ester of an organic acid based upon the carbonate weight.

The utilization of a non-polar organic solvent provides for a low conductivity suspension, which enables variations in processing voltages sufficient to accurately control the cathode coating weight and to reduce damage to the metal base material. The electrodeposition processing voltage may be varied from 500 volts to 5000 volts to produce conventional cathode coating weights within a reasonable time, e.g. 2 to 3 seconds. The homo-polar or non-polar materials which include hydrocarbon esters of organic acids have relatively low dielectric constants, e.g. diethyl carbonate and amyl acetate have constants of 3.1 and 4.8 respectively while polar solvents such as acetone and water have high dielectric constants of 26.6 and 81.1 respectively. The low dielectric constants of the non-polar materials are believed to lower the conductivity of the suspension, thereby providing the advantages enumerated above.

A suspension made in accordance with the invention may be used to coat wire, ribbon or sleeve type cathodes for electron discharge devices. In one instance, the suspension is placed in a bowl or tank and the metal base wire or sleeve is immersed therein or caused to pass therethrough. An electrode is positioned within the tank spaced from the metal to be coated. Normally, the coating tank electrode is made negative while the cathode base metal is made positive. Therefore, when the electrodes are energized during the coating operation, the carbonate particles possessing a negative charge migrate to the positively charged cathode base material.

The above described electrophoretic coating process and apparatus is well-known in the art. One example of an electrophoretic process and apparatus capable of being employed with the invention which is particularly adapted for forming coiled filamentary cathodes is described in U.S. Patent No. 2,699,426, Hoffman, January 11, 1955. After the cathode has been assembled in the tube, it is heated to drive off any volatile material and to convert the carbonates into the electron emissive oxides of barium, calcium and strontium.

Although several embodiments of the invention have been shown and described, it will be apparent to those skilled in the art that various changes and modifications may be made therein without departing from the scope of the invention as defined by the appended claims.

What is claimed is:

1. A suspension for electrophoretically coating a metal base consisting essentially of alkaline earth metal carbonates and from at least .5% to but not greater than 10% by weight of an alkaline earth metal nitrate suspended in a solution of from 6% to 60% by weight of a polymethacrylate dissolved in from 4 cc. per gram to 12 cc. per gram of a hydrocarbon ester of an organic acid, all of said weights being based upon the weight of said carbonates.

2. A suspension for electrophoretically coating a metal base consisting essentially of carbonates of barium, strontium and calcium and from at least .5% to but not greater than 10% by weight of an alkaline earth metal nitrate suspended in a solution of from 6% to 60% by weight of polyethyl methacrylate dissolved in from 4 cc. per gram to 12 cc. per gram of amyl acetate, all of said weights being based upon the weight of said carbonates.

3. A suspension for electrophoretically coating a metal base consisting essentially of alkaline earth metal carbonates of barium, strontium and calcium and from at least .5% to but not greater than 10% by weight of an alkaline earth metal nitrate suspended in a solution of from 6% to 60% by weight of polymethyl methacrylate dissolved in from 4 cc. per gram to 12 cc. per gram of diethyl carbonate, all of said weights being based upon the weight of said earth metal carbonates.

References Cited in the file of this patent

UNITED STATES PATENTS

| | | |
|---|---|---|
| 2,442,863 | Schneider | June 8, 1948 |
| 2,800,446 | Fredenburgh | July 23, 1957 |